(12) United States Patent
Boisne et al.

(10) Patent No.: US 11,713,842 B2
(45) Date of Patent: Aug. 1, 2023

(54) HYBRID MECHANICALLY LINED PIPE METHODS AND APPARATUS

(71) Applicant: J. RAY MCDERMOTT, S.A., Houston, TX (US)

(72) Inventors: Mathieu Boisne, Houston, TX (US); Julie Ingram, Fulshear, TX (US)

(73) Assignee: J Ray McDermott S.A., Houston, TX (US)

(*) Notice: Subject to any disclaimer, the term of this patent is extended or adjusted under 35 U.S.C. 154(b) by 159 days.

(21) Appl. No.: 17/096,538

(22) Filed: Nov. 12, 2020

(65) Prior Publication Data
US 2021/0148505 A1 May 20, 2021

Related U.S. Application Data

(60) Provisional application No. 62/936,179, filed on Nov. 15, 2019.

(51) Int. Cl.
*F16L 1/12* (2006.01)
*F16L 58/08* (2006.01)
(Continued)

(52) U.S. Cl.
CPC .......... *F16L 58/181* (2013.01); *F16L 58/08* (2013.01); *F16L 1/203* (2013.01)

(58) Field of Classification Search
CPC ........ F16L 1/203; F16L 1/26; F16L 13/0263; F16L 57/02; F16L 58/02
See application file for complete search history.

(56) References Cited

U.S. PATENT DOCUMENTS 8,226,327 B2    7/2012   Endal et al.
8,806,735 B2    8/2014   Howard et al.
(Continued)

FOREIGN PATENT DOCUMENTS

CA    2672210 A1    6/2008
CN    108006328 A   5/2018
(Continued)

OTHER PUBLICATIONS

"INCOLOY Alloy 825", Special Metals, Copyright date shown of Sep. 4, 2004, pp. 1-4, https://www.specialmetals.com/assets/smc/documents/alloys/incoloy/incoloy-alloy-0825.pdf, Last Accessed Nov. 12, 2020.
(Continued)

*Primary Examiner* — Sean D Andrish
(74) *Attorney, Agent, or Firm* — Patterson & Sheridan, LLP; Chad M. Dougherty

(57) ABSTRACT

Aspects of the present disclosure relates to methods of making a hybrid mechanically lined pipe, and apparatus thereof, such as lined pipe used for reeled pipe operations. In one implementation, a method of making a lined pipe for reeled pipe operations includes determining a minimum weld overlay length for a first pipe joint, and providing the first pipe joint. The first pipe joint includes a first end opposite of a second end, a central opening, and an inner surface. The method includes mechanically lining the inner surface of the first pipe joint with a first section of alloy. The method also includes weld overlaying a second section of alloy and a third section of alloy in the central opening and on both sides of the first section of alloy over the minimum weld overlay length to prevent excessive deformation of the mechanically bonded section during reeling operations.

12 Claims, 5 Drawing Sheets

(51) Int. Cl.
*F16L 58/18* (2006.01)
*F16L 1/20* (2006.01)

(56) References Cited

U.S. PATENT DOCUMENTS

| | | | |
|---|---|---|---|
| 8,864,417 B2 | 10/2014 | Tkaczyk et al. | |
| 8,876,433 B2 | 11/2014 | Mair et al. | |
| 8,894,327 B2 | 11/2014 | Mair et al. | |
| 8,905,675 B2 | 12/2014 | Bertaso et al. | |
| 9,004,341 B2 * | 4/2015 | Shitamoto | B23K 31/027 |
| | | | 228/141.1 |
| 2010/0006545 A1 * | 1/2010 | Macia | B23K 31/02 |
| | | | 228/103 |
| 2012/0257931 A1 | 10/2012 | Tkaczyk et al. | |
| 2012/0269581 A1 | 10/2012 | Mair et al. | |
| 2013/0195557 A1 | 8/2013 | Bertaso et al. | |
| 2018/0313490 A1 | 11/2018 | Schuller | |

FOREIGN PATENT DOCUMENTS

| | | |
|---|---|---|
| EP | 2092160 B1 | 11/2011 |
| EP | 3507535 A1 | 7/2019 |
| GB | 2474736 A | 4/2011 |
| GB | 2479379 B | 11/2015 |
| WO | 2008072970 A1 | 6/2008 |
| WO | 2011051221 A1 | 5/2011 |
| WO | 2011077110 A1 | 6/2011 |
| WO | 2011124919 A1 | 10/2011 |
| WO | 2014080281 A2 | 5/2014 |
| WO | 2016016713 A1 | 2/2016 |
| WO | 2018042246 A1 | 3/2018 |

OTHER PUBLICATIONS

"INCONEL Alloy 625", Special Metals, Copyright date shown of Aug. 13, 2013, pp. 1-18, https://www.specialmetals.com/assets/smc/documents/alloys/inconel/inconel-alloy-625.pdf, Last Accessed Nov. 12, 2020.
Vasilikis, Daniel et al., "Mechanical behavior and wrinkling of lined pipes", International Journal of Solids and Structures 49, Aug. 7, 2012, pp. 3432-3446, https://www.sciencedirect.com/science/article/pii/S0020768312003241?via%3Dihub, Last Accessed Nov. 12, 2020.
Hilberink, A., "Mechanical Behaviour of Lined Pipe", Technische Universiteit Delft, Dec. 19, 2011, http://resolver.tudelft.nl/uuid:23af0b63-1add-4004-a9c5-e0cbb920c11f, Last Accessed Mar. 10, 2021.
International Search Report and Written Opinion dated Feb. 19, 2021 for Application No. PCT/US2020/060139.
India Examination Report issued to Application No. 202217029860 dated Sep. 13, 2022.
Singapore Office Action issued to Application No. 522432613 dated Jan. 30, 2023.

* cited by examiner

HYBRID MECHANICALLY LINED PIPE METHODS AND APPARATUS

CROSS-REFERENCE TO RELATED APPLICATIONS

This application claims benefit of U.S. provisional patent application Ser. No. 62/936,179, filed Nov. 15, 2019, which is herein incorporated by reference in its entirety.

BACKGROUND

Field

Aspects of the present disclosure relate to methods of designing and making hybrid mechanically lined pipe, and apparatus thereof, such as lined pipe used for reel-lay operations.

Description of the Related Art

Joints of lined pipe used to make pipelines may have differing properties. The differing properties of the pipe joints can cause wrinkling of the liner in the pipeline when the pipe is bent, such as during reeling and unreeling of the pipe. The wrinkling can create operational issues, for example by inducing pressure drop, inhibiting pipeline pigging, and/or causing fracturing of liner.

Therefore, there is a need for simple and cost-effective methods of making lined pipe that facilitate reduced or eliminated liner wrinkling.

SUMMARY

Aspects of the present disclosure relate to methods of designing and making hybrid mechanically lined pipe, and apparatus thereof, such as lined pipe used for reel-lay operations.

In one implementation, a method of making a lined pipe for reel-lay operations includes determining a minimum weld overlay length for a first pipe joint, and positioning the first pipe joint for liner operations. The first pipe joint includes a first end opposite of a second end, a central opening, and an inner surface. The method also includes disposing a first section of alloy in the central opening of the first pipe joint, and mechanically lining the inner surface of the first pipe joint with the first section of alloy. The method also includes weld overlaying a second section of alloy in the central opening and on a first side of the first section of alloy. The weld overlaying includes welding the second section of alloy to the inner surface of the first pipe joint along a first length that is greater than or equal to the minimum weld overlay length.

In one implementation, a hybrid mechanically lined pipe includes a spool, and a pipeline reeled onto the spool. The pipeline includes one or more pipe joints. Each respective pipe joint of the one or more pipe joints includes a first weld overlay alloy welded to the respective pipe joint along a first length, a second weld overlay alloy welded to the respective pipe joint along a second length, and a liner mechanically lined to the respective pipe joint. The liner is disposed between the first weld overlay alloy and the second weld overlay alloy. Each of the first length and the second length is greater than or equal to a minimum weld overlay length to reduce or prevent wrinkling of the liner.

In one implementation, a pipe includes a pipe joint, a liner mechanically lined to the pipe joint, and a weld overlay welded within the pipe joint. The weld overlay has a weld overlay length that is greater than or equal to a predetermined length to prevent wrinkling of the liner.

BRIEF DESCRIPTION OF THE DRAWINGS

So that the manner in which the above-recited features of the disclosure can be understood in detail, a more particular description of the disclosure, briefly summarized above, may be had by reference to implementations, some of which are illustrated in the appended drawings. It is to be noted, however, that the appended drawings illustrate only typical embodiments of this disclosure and are therefore not to be considered limiting of its scope, for the disclosure may admit to other equally effective embodiments.

Figure 1A:
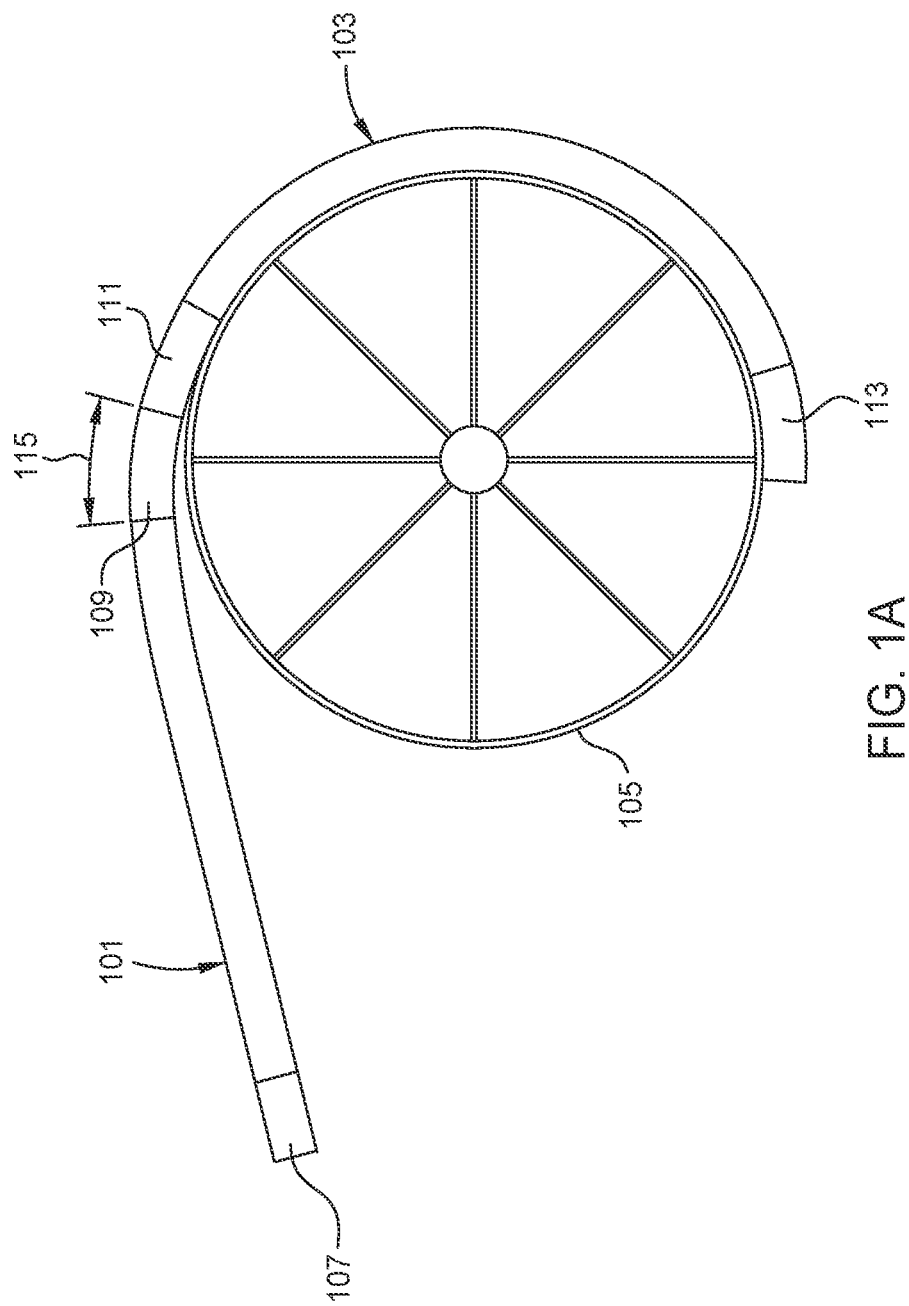
FIG. 1A is a partial schematic view of a first pipe joint and a second pipe joint being reeled onto a spool, according to one implementation. This partial schematic view shows only the two consecutive joints which are part of a much longer assembly of joints called a stalk. Several stalks may be joined together and be reeled onto the spool.

To facilitate understanding, identical reference numerals have been used, where possible, to designate identical elements that are common to the figures. It is contemplated that elements disclosed in one implementation may be beneficially utilized on other implementations without specific recitation.

DETAILED DESCRIPTION

Aspects of the present disclosure relates to methods of making lined pipe to be used for reel-lay applications. The aspects disclosed herein facilitate reduced or eliminated liner wrinkling of liner inside the pipe during any bending cycle associated with reeling operations, such as reeling or unreeling of the pipe.

FIG. 1A is a partial schematic view of a first pipe joint 103 and a second pipe joint 101 being reeled onto a spool 105, according to one implementation. The spool 105 can be referred to as a reel. The first pipe joint 103, the second pipe joint 101, and one or more additional pipe joints may be reeled onto the spool 105 and the spool 105 placed on a vessel for conducting reel-lay operations. The pipe joints 101, 103 may be reeled onto the spool 105 to form a reeled hybrid mechanically lined pipe. The reel may be removable or a permanent piece of equipment of an installation vessel. The first pipe joint 103 and the second pipe joint 101 may be part of a longer pipeline. Pipe joints, such as the first pipe joint 103 and the second pipe joint 101, are reeled onto the spool 105 to form a reeled pipeline apparatus. The reel-lay operations may take place offshore using the vessel and may include pipe-laying operations where the pipe joints 101, 103 reeled onto the spool 105 are unreeled from the spool 105 and layed into the ocean, from the vessel, and toward the seafloor to be used as part of oil and gas equipment such as a flowline or a riser. Fluid is flowed through the pipe joints 101, 103 after the pipe joints 101, 103 are unreeled from the spool 105. In one example, the fluid includes production fluids, such as hydrocarbons. In one example, the fluid includes injection fluids. The reeling operation may include all or some of the following operations: reeling the pipe onto a spool, unreeling pipe from the spool, bending the pipe over an aligner, bending the pipe through a straightener, and/or reversal and/or repeating of one or more of the preceding operations.

The first pipe joint 103 includes a first joint section 113 at a first end thereof and a second joint section 111 at a second end thereof. The second pipe joint 101 includes a first joint section 109 at a first end thereof and a second joint section 107 at a second end thereof. The second joint section 111 of the first pipe joint 103 is welded to the first joint section 109 of the second pipe joint 101. The second joint section 111 is welded to the first joint section 109 prior to initiating bending in the second joint section 111 and the first joint section 109. The first joint section 113 is coupled to the spool 105 to initiate reeling of the pipe joints. One or more additional pipe joints (e.g., stalks of pipe) may be reeled onto the spool 105. In one example, a plurality of pipe joints are welded together to form a pipeline that is several kilometers long, and the pipeline is reeled onto the spool 105.

As illustrated in FIG. 1A, the first joint section 109 and the second joint section 111 are undergoing bending while being reeled onto the spool 105. The first joint section 109 and the second joint section 111 may include differing stiffnesses due to the potential for differing properties between the first pipe joint 103 and the second pipe joint 101. For example, the first joint section 109 and the second joint section 111 may include but are not limited to differing manufacturing tolerances, differing pipe thicknesses, differing diameters, differing mechanical properties (such as yield strengths and/or ultimate tensile strength).

Due to the differing properties between the first joint section 109 and the second joint section 111, a mechanically lined alloy disposed inside of the first pipe joint 103 and/or the second pipe joint 101 may wrinkle and become at least partially separated from the parent pipe of 103 or 101. As an example, the differing bending stiffnesses may cause the first joint section 109 of the second pipe joint 101 to be weaker than the second joint section 111 of the first pipe joint 103. The weaker pipe joint section 109 will bend more than the neighbouring and stronger pipe section 111. As a result, the weaker pipe section may see an increased bending strain. The relatively increased bending strain causes an increased risk of liner wrinkling. A larger number of times that a pipe undergoes bending and a larger magnitude of bending can each increase the risk of liner wrinkling.

In accordance with aspects of the present disclosure, a minimum weld overlay length 115 (shown in FIG. 1B) is determined for second and third internal liner sections 125 and 127 such that the second and third internal liner sections 125 and 127 encompass the pipe sections exposed to increased deformations due to differing pipe properties. The lengths of second and third internal liner sections 125 and 127 are defined by the minimum weld overlay length 115 potentially exposed to increased deformation plus optionally additional length accounting for welding process allowances such as cut-out and re-weld. The lengths of the second and third internal liner sections 125 and 127 can accordingly be longer than the minimum weld overlay length 115.

The minimum weld overlay length 115 is determined using an engineering analysis taking into account all pipe properties variations and the reeling process parameters. The analysis defines the length of pipe at risk for unacceptable wrinkle formation for the application due to the mismatch of properties between two joined pipes. In one example, the engineering analysis uses a computer modeling software such as finite element analysis (FEA).

In one embodiment, which can be combined with other embodiments, the minimum weld overlay length 115 is greater than 70 mm. In one example, the minimum weld overlay length 115 is greater than 300 mm.

In one embodiment, which can be combined with other embodiments, the resultant deformation used to determine the minimum weld overlay length 115 is determined prior to reeling of the pipe for installation by simulating the reeling operation on a test bench. During the simulating, reeling of the first pipe joint 103 and the second pipe joint 101 onto the spool 105 is simulated. In one example, the simulating of the reeling is conducted using computer modeling software, such as finite element analysis (FEA) software. The simulation of the reeling operations uses parameters of the first pipe joint 103, the second pipe joint 101, the spool 105, and other equipment such as an aligner (shown on a tower 216 in FIGS. 2A and 2B) and a straightener of the lay vessel. In one example, the simulation simulates bending of the first pipe joint 103 and the second pipe joint 101 during reeling operations and/or unreeling operations. The parameters include but are not limited to spool diameter, pipe inner diameters, pipe outer diameters, pipe lengths, pipe and liner material properties (for example yield strength and/or ultimate tensile strength), straightener settings, reeling tension, reel back tension, mechanical liner thickness, mechanical liner length, weld overlay thickness, and/or weld overlay length.

In one embodiment, which can be combined with other embodiments, the simulating includes simulating a resultant deformation (such as a resultant strain) of the first pipe joint 103 and/or the second pipe joint 101 during the simulated reeling. Using a threshold deformation (such as a threshold strain), the resultant deformation is used to determine the minimum weld overlay length 115. The resultant deformation is compared to the threshold deformation to determine the minimum weld overlay length 115. In one example, which can be combined with other examples, the minimum weld overlay length 115 that is determined is a weld overlay length at which the resultant deformation is equal to or lesser than the threshold deformation. In one example, the resultant deformation is determined for each of the joint sections 107, 109, 111, and 113 by simulating the reeling to determine the minimum weld overlay length 115 to be used for each of the joint sections 107, 109, 111, and 113.

Figure 1B:
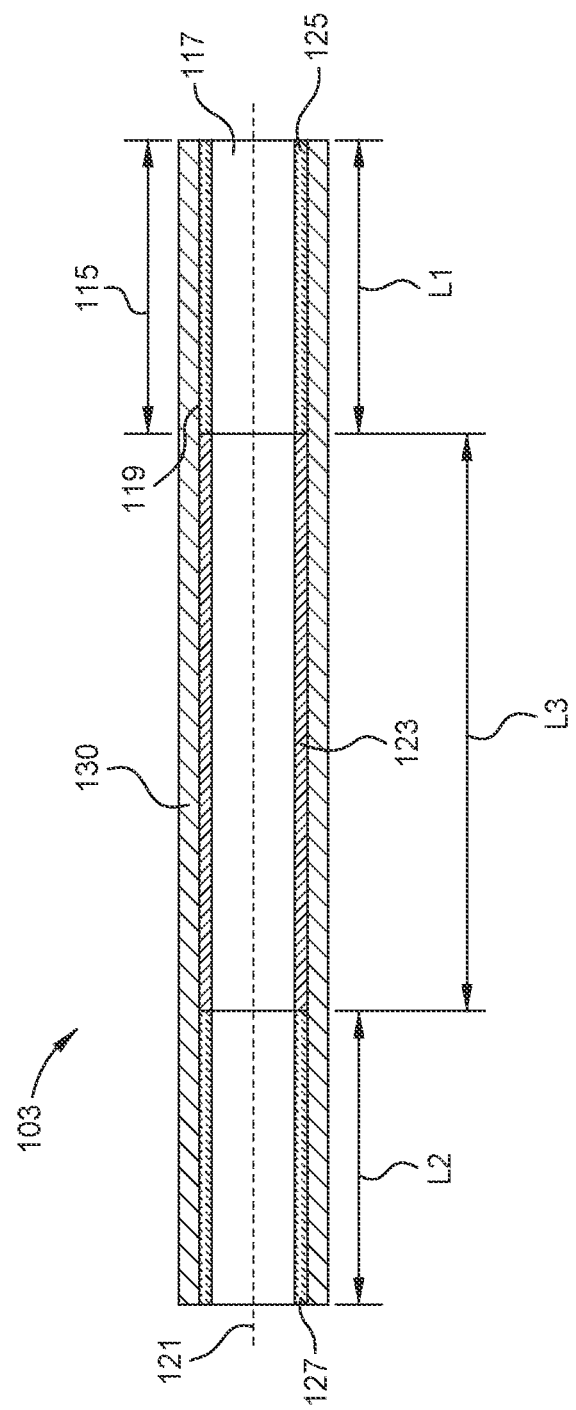
FIG. 1B is a partial schematic view of the first pipe joint illustrated in FIG. 1A prior to being welded to the second pipe joint and reeled onto the spool, according to one implementation.

FIG. 1B is a partial schematic view of the first pipe joint 103 illustrated in FIG. 1A prior to being welded to the second pipe joint 101 and reeled onto the spool 105, according to one implementation. The first pipe joint 103 includes carbon steel. The first pipe joint 103 includes a parent pipe 130, a central opening 117, and an inner surface 119. The first pipe joint 103 includes a longitudinal axis 121 extending through a center of the first pipe joint 103. The first pipe joint 103 includes a first internal liner section 123 disposed in the central opening 117 and axially aligned with the longitudinal axis 121. The first internal liner section 123 is a first section of alloy including a tube disposed in the central opening 117 that includes a corrosion resistant alloy. The first internal liner section 123 is a liner that is mechanically lined on the inner surface 119 of the parent pipe 130.

The first internal liner section 123 is mechanically lined to the inner surface 119 by pressuring the central opening 117 with a pressurized fluid to mechanically bond the first internal liner section 123 to the inner surface 119. The first internal liner section 123 is deformed to bond the first internal liner section 123 to the inner surface 119. After the first internal liner section 123 is mechanically bonded to the inner surface 119, a second internal liner section 125 is weld overlaid in the central opening 117 on a first side of the first internal liner section 123, and a third internal liner section 127 is weld overlaid in the central opening 117 on a second side of the first internal liner section 123. The second internal liner section 125 is a second section of alloy and the third internal liner section 127 is a third section of alloy. Each of the second internal liner section 125 and the third internal liner section 127 abut the first internal liner section 123 at opposite ends of the internal liner section 123. Each of the second internal liner section 125 and the third internal liner section 127 includes a corrosion resistant alloy. The second internal liner section 125 corresponds to the first joint section 109 (illustrated in FIG. 1A) and the third internal liner section 127 corresponds to the second joint section 107 (illustrated in FIG. 1A).

In the implementation shown in FIG. 1B, a single pipe joint 103 includes the parent pipe 130 lined by internal liner sections 123, 125 and 127. The first internal liner section 123 is mechanically lined and the second and third internal liner sections 125 and 127 are weld overlaid.

Each of the second internal liner section 125 and the third internal liner section 127 is a weld overlay alloy. After the first internal liner section 123 is mechanically bonded to the inner surface 119 and before initiating bending by reeling the first pipe joint 103, the second and third sections of alloy 125, 127 are welded to the inner surface to create a metallurgical bond between the sections of alloy 125, 127 and the inner surface 119. The second internal liner section 125 is welded to the inner surface 119 along a first length L1. The third internal liner section 127 is welded to the inner surface 119 along a second length L2. Each of the first length L1 and the second length is equal to or greater than the minimum weld overlay length 115 that is determined as discussed above. The minimum weld overlay length 115 is illustrated as linear and longitudinal in FIG. 1B as the first pipe joint 103 is not yet undergoing bending from reeling. The first internal liner section 123 is mechanically bonded to the inner surface 119 along a third length L3. The first length L1, the second length L2, and the third length L3 are each linear and longitudinal. The first length L1, the second length L2, and the third length L3 are each parallel to the longitudinal axis 121 and the minimum weld overlay length 115 that is illustrated as linear and longitudinal in FIG. 1B.

The present disclosure contemplates that the second internal liner section 125 and the third internal liner section 127 may be weld overlaid at the same time. The present disclosure contemplates that one of the second internal liner section 125 or the third internal liner section 127 may be weld overlaid prior to weld overlaying of the other of second internal liner section 125 or the third internal liner section 127.

In one embodiment, which can be combined with other embodiments, the corrosion resistant alloy of the first internal liner section 123, the second section of alloy 125, and/or the third internal liner section 127 includes one or more of the following materials: nickel, chromium, cobalt, titanium, iron, molybdenum, copper, niobium, tantalum, carbon, manganese, silicon, phosphorus, sulfur, and/or aluminum. The corrosion resistant alloy facilitates reduced or eliminated corrosion of the first pipe joint 103 while fluids (such as production fluids or injection fluids) flow through the first pipe 103 joint. In one embodiment, which can be combined with other embodiments, the corrosion resistant alloy of the first internal liner section 123, the second section of alloy 125, and/or the third internal liner section 127 includes stainless steel.

Weld overlaying the first length L1 and the second length L2 that are each greater than the minimum weld overlay length 115 facilitates reducing or preventing wrinkling of the first internal liner section 123 (which is mechanically lined) without requiring metallurgical bonding of the first internal liner section 123 to the inner surface. The risk of wrinkling of the first internal liner section 123 is reduced or eliminated during bending because the resultant deformation of the first pipe joint 103 corresponding to the third length L3 during reeling is not exposed to increased deformation due to mismatch of properties between the first pipe joint 103 and an adjacent joint. Using the minimum weld overlay length 115 also facilitates preventing liner wrinkling and avoiding or reducing the use of: thicker pipes, thicker liners, internal pipe pressure while reeling, tighter pipe tolerances, and operations where re-reeling is prohibited. Hence, using the minimum weld overlay length 115 facilitates reducing or preventing liner wrinkling while facilitating benefits of reduced costs, reduced operational times, reduced operational difficulty, reduced vessel payload, and improved flow performance.

Figure 2A:
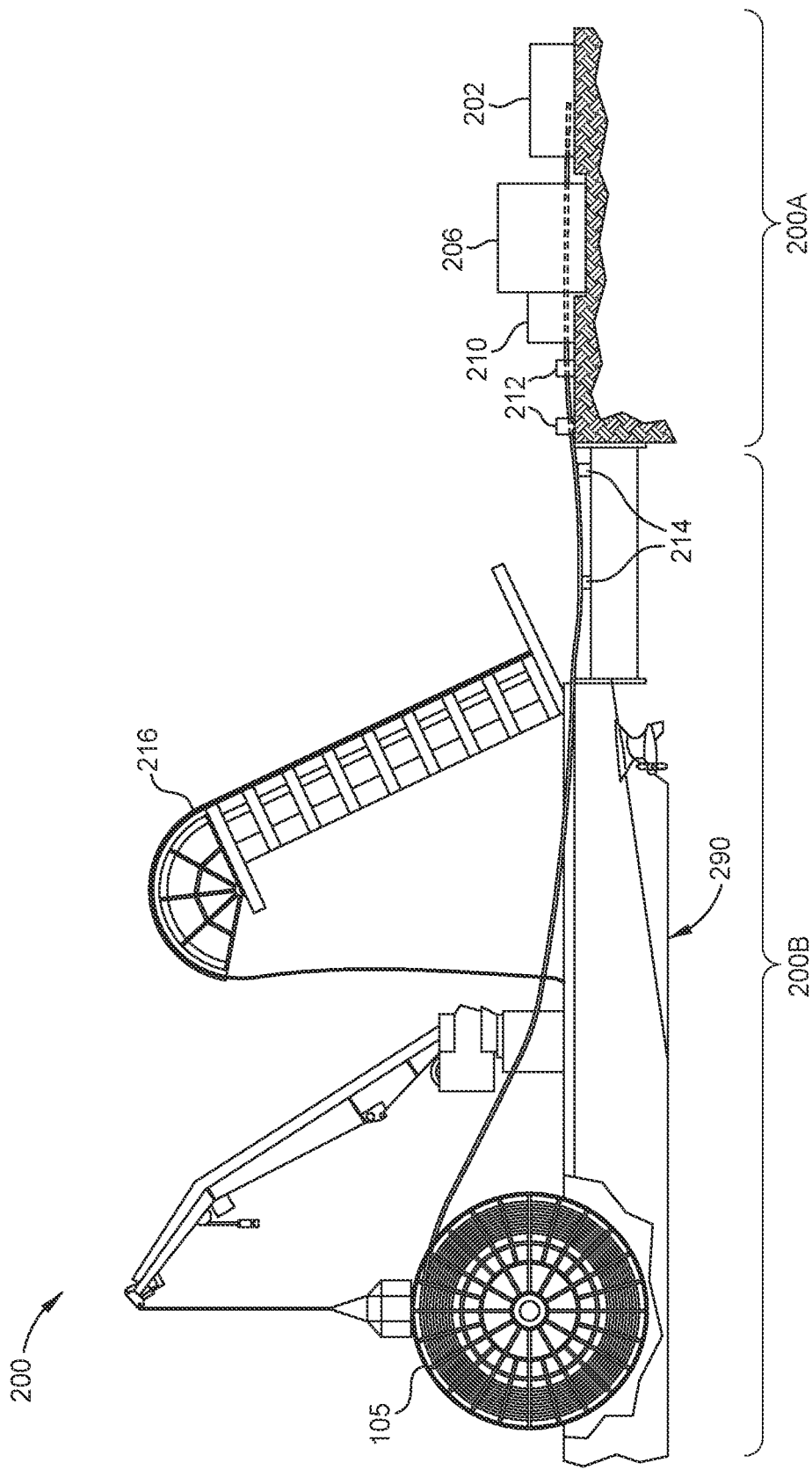
FIG. 2A is a partial schematic view of a reeling system, according to one implementation.

FIG. 2A is a partial schematic view of a reeling system 200, according to one implementation. The reeling system 200 is a reel-lay and spoolbase system. The reeling system 200 includes at least two regions, a first on-shore region 200A and a second, adjacent, on-board region 200B. The on-board region 200B is on-board an offshore vessel 290. The offshore vessel 290 is an installation vessel (e.g., a pipelay vessel). The first on-shore region 200A includes a tie-in module 202 adjacent to an onshore tensioner 206 which can be adjacent to a joint coating station 210. The tensioner 206 may also be installed on the offshore vessel 290. Welding operations occur at the tie-in module 202. In one example, welding of pipe joints together occurs at the tie-in module 202. One or more on-shore (or onboard the offshore vessel 290, as needed) rollers 212 (two are shown) may be employed to advance the pipe joints from the tie-in module 202, the onshore tensioner 206, and the joint coating station 210 and toward one or more on-board rollers 214 that are part of the on-board region 200B.

Figure 2B:
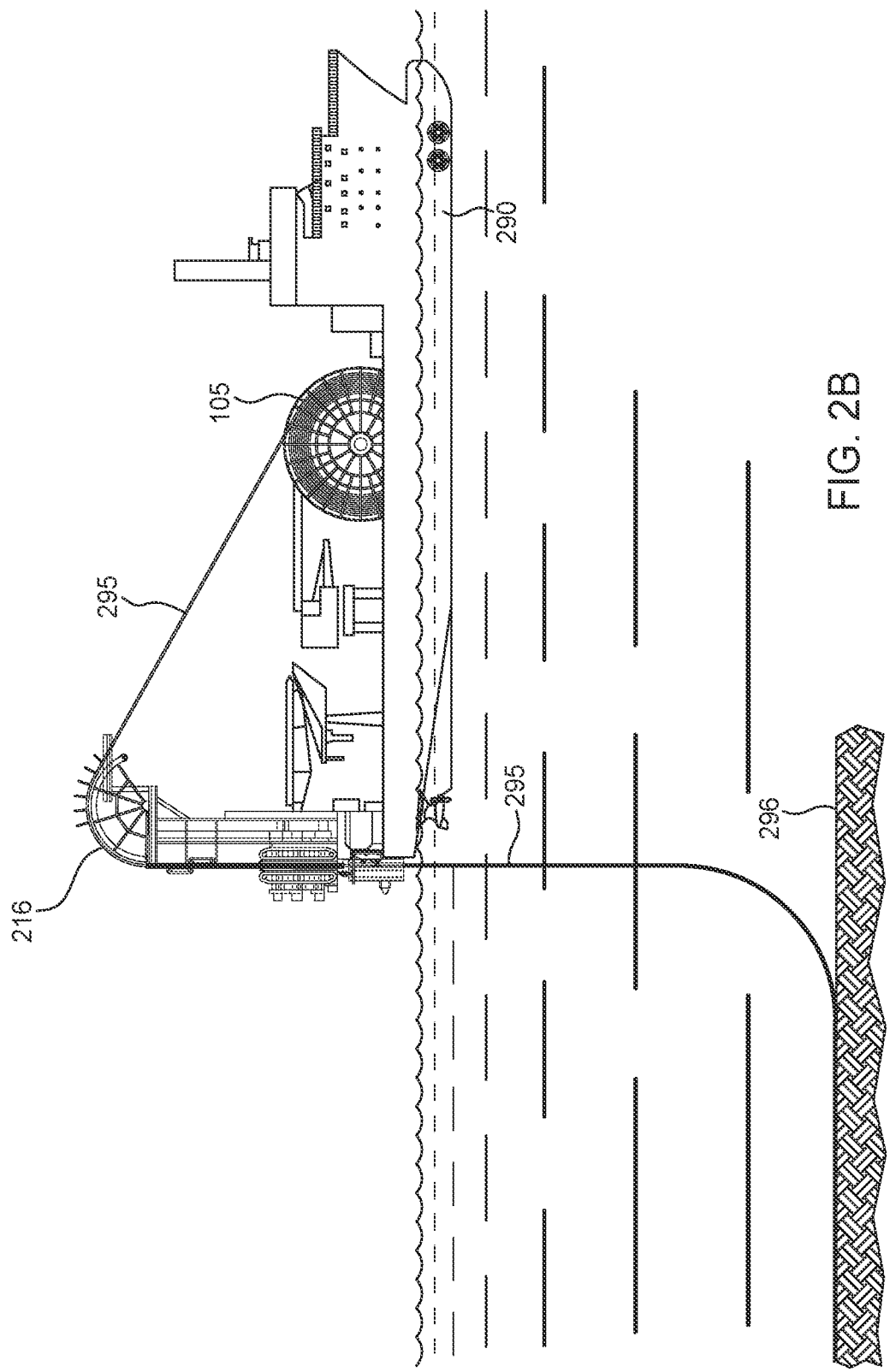
FIG. 2B is a partial schematic view of the offshore vessel and spool disposed thereon, illustrated in FIG. 2A, during an offshore pipe-laying operation, according to one implementation.

FIG. 2B is a partial schematic view of the offshore vessel 290 and spool 105 disposed thereon, illustrated in FIG. 2A, during an offshore pipe-laying operation, according to one implementation. A pipeline 295 is unreeled from the spool 105 to pay out the pipeline 295 toward an oil and gas operations location, such as an oil and gas operations location on a seafloor 296. The pipeline 295 is paid out by unloading (or unreeling) the pipeline 295 from the spool 105 disposed on the offshore vessel 290. The pipeline 295 includes the pipe joints previously welded together and reeled onto the spool 105. The pipeline 295 is unloaded from the spool 105 and fed over an aligner and through a tower 216 that may include a straightener and one or more tensioners.

Figure 3:
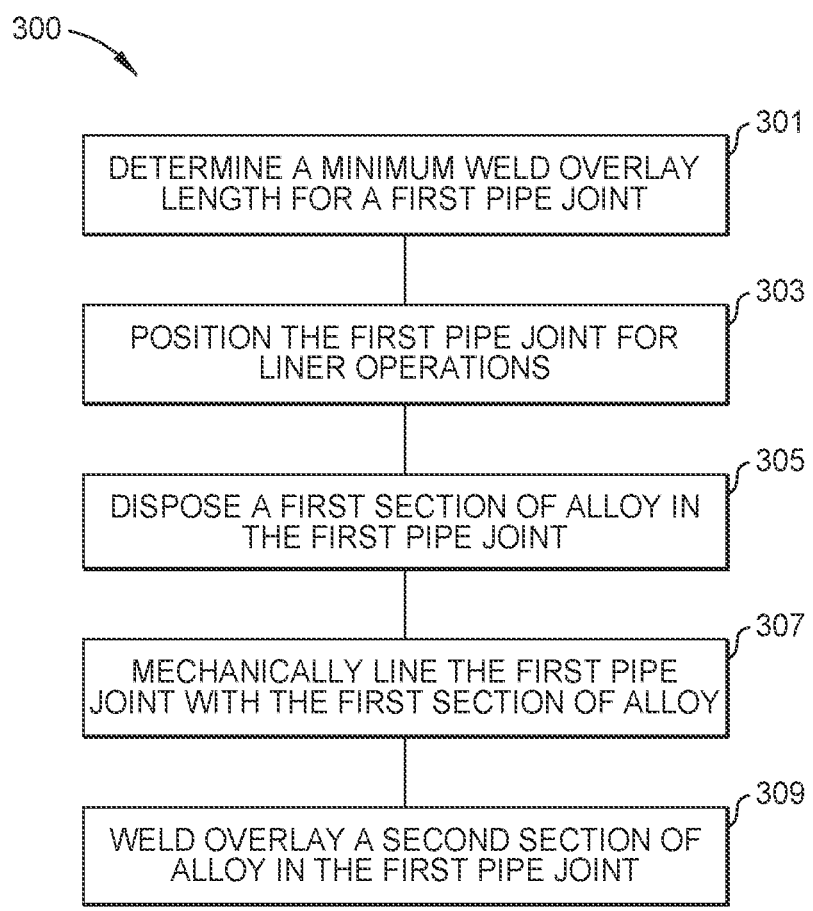
FIG. 3 is a schematic view of a method of making a lined pipe for reel-lay operations, according to one implementation.

FIG. 3 is a schematic view of a method 300 of making a lined pipe for reel-lay operations, according to one implementation. Operation 301 of the method 300 includes determining a minimum weld overlay length for a first pipe joint, and operation 303 includes positioning the first pipe joint for liner operations. The first pipe joint includes a first end opposite of a second end, a central opening, and an inner surface. Operation 305 includes disposing a first section of alloy in the central opening of the first pipe joint. Operation 307 includes mechanically lining the inner surface of the first pipe joint with the first section of alloy. Operation 309 includes weld overlaying a second section of alloy in the central opening of the first pipe joint and on a first side of the first section of alloy. The weld overlaying includes welding the second section of alloy to the inner surface of the first pipe joint along a first length that is greater than or equal to the minimum weld overlay length.

Benefits of the present disclosure include at least: ability to use re-reeling, reduced vessel payload, cost savings, time savings, improved flow performance, ease of operations, and reduced rejections of manufactured pipes for being outside of manufacturing tolerances.

Aspects of the present disclosure include at least: weld overlay lengths equal to or greater than a minimum weld length; determining a minimum weld length; simulating a resultant deformation (such as a resultant strain); and determining and using a threshold deformation (such as a threshold strain) to determine a minimum weld overlay length. It is contemplated that one or more of the aspects disclosed herein may be combined. Moreover, it is contemplated that one or more of these aspects may include some or all of the aforementioned benefits.

The present disclosure contemplates that the aspects described herein for the first pipe joint 103 may be implemented for the second pipe joint 101 and/or one or more additional pipe joints.

It will be appreciated by those skilled in the art that the preceding embodiments are exemplary and not limiting. While the foregoing is directed to embodiments of the present disclosure, other and further embodiments of the disclosure may be devised without departing from the basic scope thereof. It is intended that all modifications, permutations, enhancements, equivalents, and improvements thereto that are apparent to those skilled in the art upon a reading of the specification and a study of the drawings are included within the scope of the disclosure. It is therefore intended that the following appended claims may include all such modifications, permutations, enhancements, equivalents, and improvements. The present disclosure also contemplates that one or more aspects of the embodiments described herein may be substituted in for one or more of the other aspects described.

We claim:

1. A method of making a lined pipe for reel-lay operations, comprising:
    determining a weld overlay length for a first end and a second end of a first pipe joint based on bending properties of the first pipe joint, the weld overlay length configured to prevent wrinkle formation of the lined pipe;
    positioning the first pipe joint for liner operations, the first pipe joint comprising the first end opposite of the second end of the first pipe joint, a central opening, and an inner surface;
    disposing a first section of alloy in the central opening of the first pipe joint;
    mechanically lining the inner surface of the first pipe joint with the first section of alloy;
    weld overlaying a second section of alloy to the inner surface of the first end of the first pipe joint along a first length that is greater than or equal to the determined weld overlay length of the first end of the first pipe joint; and
    weld overlaying a third section of alloy to the inner surface of the second end of the first pipe joint along a second length that is greater than or equal to the determined weld overlay length of the second end of the first pipe joint.

2. The method of claim 1, further comprising welding the first end of the first pipe joint to a second end of a second pipe joint.

3. The method of claim 2, further comprising reeling the first pipe joint and the second pipe joint onto a spool.

4. The method of claim 1, wherein the first section of alloy, the second section of alloy, and the third section of alloy each comprises a corrosion resistant alloy.

5. The method of claim 4, wherein the corrosion resistant alloy comprises one or more of stainless steel, nickel, chromium, cobalt, titanium, iron, molybdenum, copper, niobium, tantalum, carbon, manganese, silicon, phosphorus, sulfur, or aluminum.

6. The method of claim 1, wherein the bending properties and a behavior of the first pipe joint are determined by simulating the bending of the first pipe joint using finite element analysis (FEA) software.

7. The method of claim 6, wherein the simulating the bending of the first pipe joint is based on one or more parameters, and the one or more parameters include one or more of a spool diameter, a pipe inner diameter, a pipe outer diameter, a pipe length, a pipe material property, a liner material property, a straightener setting, a reeling tension, a reel back tension, a mechanical liner thickness, a mechanical liner length, or a weld overlay thickness, or a weld overlay length.

8. The method of claim 6, wherein the simulating the bending of the first pipe joint comprises simulating a resultant deformation of the first pipe joint, and the determining the weld overlay length further comprises comparing the resultant deformation to a threshold deformation.

9. The method of claim 8, wherein the weld overlay length of the first end and the second end are each a weld overlay length at which the resultant deformation is equal to or lesser than the threshold deformation.

10. The method of claim 1, wherein the weld overlay length of the first end is different than the weld overlay length of the second end.

11. The method of claim 1, wherein the welds of the second section of alloy and the third section of alloy abut the first section of alloy.

12. The method of claim 1, wherein the welds of the second section of alloy and the third section of alloy are performed at the same time.

* * * * *